Nov. 3, 1953  L. E. GILREATH  2,657,619
CLOD BREAKER
Filed Oct. 22, 1948  2 Sheets-Sheet 1
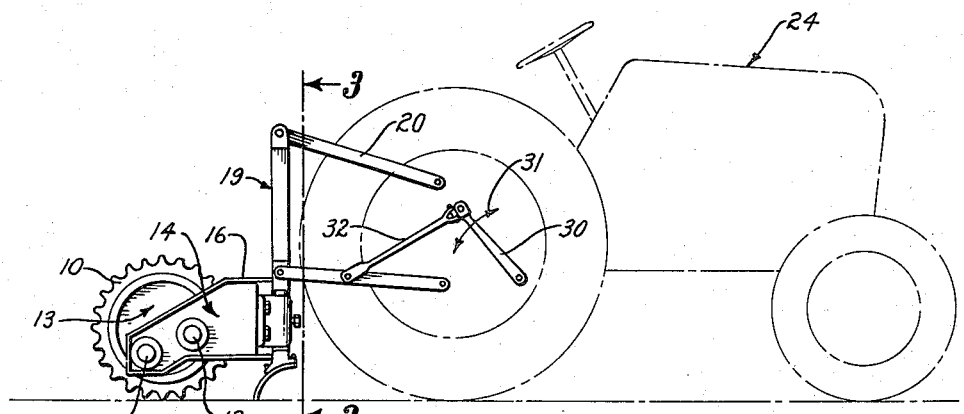
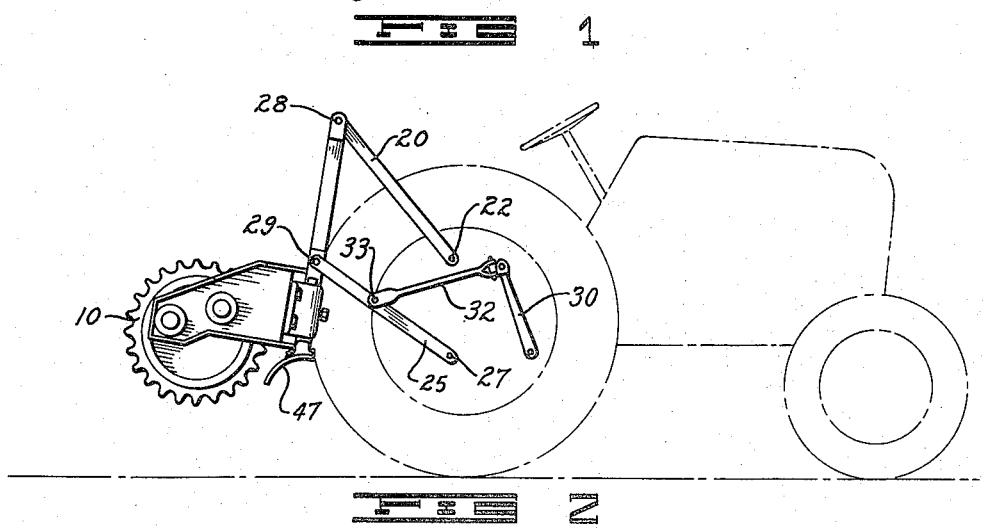
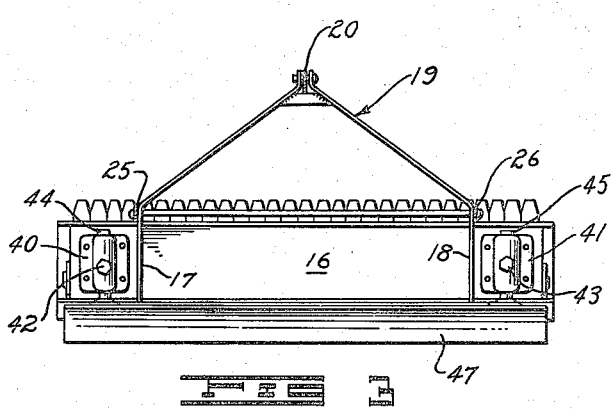
INVENTOR.
LAFAYETTE E. GILREATH
BY
ATTORNEYS

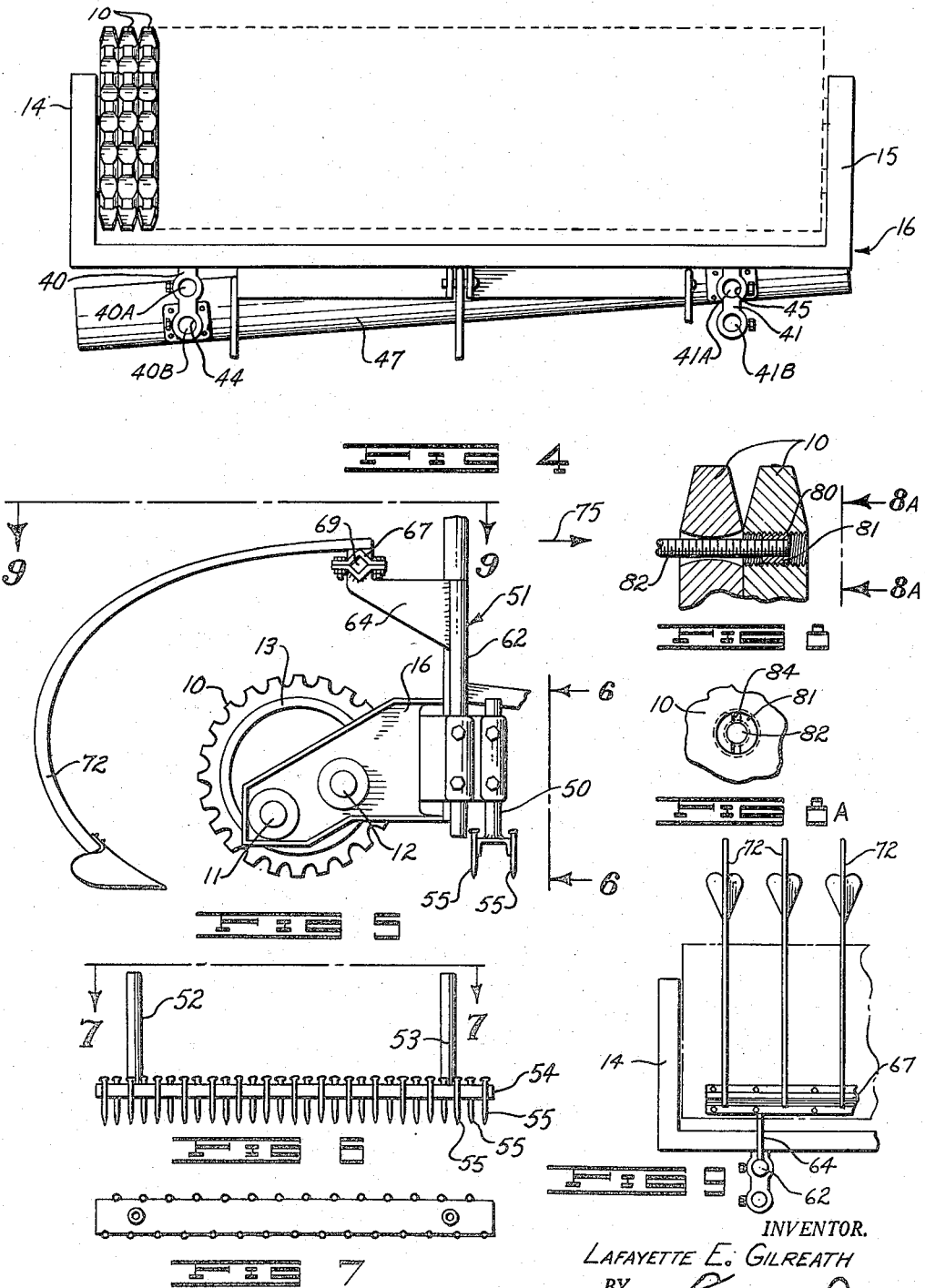

Patented Nov. 3, 1953

2,657,619

UNITED STATES PATENT OFFICE 2,657,619

CLOD BREAKER

Lafayette E. Gilreath, Fresno, Calif., assignor to Lyman G. Perkins, Fresno, Calif.

Application October 22, 1948, Serial No. 55,910

3 Claims. (Cl. 97—7)

1

The present invention relates to improvements in the clod breaker shown and claimed in my copending application Serial No. 778,109, filed October 6, 1946, now Patent No. 2,513,165, for Clod Breaker, although some of the features of the present invention are applicable to similar agricultural earth-working implements useful in seed bed preparation and cultivation.

An object of the present invention is to provide an improved arrangement for mounting the clod breaker shown and described in my copending application on a wheeled vehicle such as a tractor.

Another object of the present invention is to provide an improved arrangement whereby the clod breaker shown in my copending application may be mounted for movement from an operative position to an inoperative position on existing present-day tractors having a movable torque arm, the torque arm of such tractor being connected to the present arrangement for producing the desired results.

Still another object of the present invention is to provide an improved arrangement for assembling and holding in assembled relationship the series of individual relatively movable rings in my clod breaker shown in the above-mentioned patent application.

Yet a further object of the present invention is to provide an improved supporting arrangement for the scraper associated with the clod breaker, characterized by the fact that the scraper may be maintained in different adjusted positions.

Yet a further object of the present invention is to provide an improved arrangement characterized by its simplicity, by virtue of which earth may be first harrowed, then pulverized, and then furrows made in the previously prepared earth.

Yet another object of the present invention is to provide an improved clod breaker supporting means characterized by its versatility in supporting different types of agricultural equipment thereon.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which Figure 1 is a view in side elevation of the

2 clod breaker shown in my above-mentioned copending application supported in a novel manner on a conventional tractor shown in dotted lines, the clod breaker being in its useful position wherein it is effective to pulverize earth;

Figure 2 is a view similar to the view shown in Figure 1, but shows the parts therein in the position they assume when the clod breaker is moved to retracted position;

Figure 3 is a view taken substantially on the line 3—3 of Figure 1;

Figure 4 is a top plan view showing a modified structure allowing adjustment of the scraper shown in Figures 1, 2 and 3;

Figure 5 is a view in end elevation of the apparatus shown in Figure 4 but with the scraper removed and different agricultural implements mounted thereon;

Figure 6 is a view of the harrow taken in the direction indicated by the arrows 6—6 in Figure 5;

Figure 7 is a top plan view of the harrow shown in Figure 6;

Figures 8 and 8a show an improved structure whereby the individual rings of my clod breaker may be assembled and held in assembled relationship; and Figure 9 is a sectional view taken substantially in the direction indicated by the line 9—9 of Figure 5.

A feature of the present invention resides in the provision of supporting means for my clod breaker described in my above-mentioned copending application, the supporting means being readily attachably mounted to the chassis of a conventional existing tractor and movable by a power actuated member of such tractor to move the clod breaker to useful and retracted positions.

Referring to Figures 1 and 2, the clod breaker comprises a plurality of rings 10 having tubular members 11, 12 passing through the hollow portion 13 of the rings, the ends of the tubes 11, 12 being supported in opposite parallel extending end members 14, 15 of the frame 16. The frame member 16 has welded thereto the legs 17, 18 of the A-frame having the general reference numeral 19. The apex of the A-frame has pivotally mounted thereto one end of the rod 20, the other end of the rod 20 being pivoted at 22 to the chassis of tractor 24.

Also, the A-frame 19 has pivotally mounted thereon, on adjacent sides thereof, a pair of arms 25, 26, the other ends of such arms 25, 26 being pivotally mounted to the chassis or frame of tractor 24 at 27. The arms 25 and 26 are of equal length and extend parallel to one another. The arms 20, 25, 26 thus serve as elements of a modified pivoted parallelogram structure for pivotally mounting the frame 16 to the frame of tractor 24, it being noted that suspension thus provided is not truly a parallelogram, since the spacing between the apex 28 and pivot axis 29 is somewhat greater than the distance between the pivots 22 and 27. It is preferred to have such unequal distances to obtain a desired movement of the frame 16 and ring 10 when such ring assembly is moved from retracted to ground-engaging positions.

The tractor 24 incorporates in conventional manner a pair of power-actuated arms 30 movable in the arc of a circle represented by the arrows 31. This pair of arms 30 extend parallel and are operated synchronously by conventional means found on present day tractors. The free ends of this pair of arms 30 are pivotally attached to one end of a pair of arms 32 respectively, the other ends of such arms being pivotally connected to corresponding intermediate points at 33 on arms 25 and 26. Although the drawings show only one of such arms 30 and 32, the other corresponding arms 30 and 32 extend parallel to the ones shown in the drawings and are operated synchronously. Thus when the power-actuated arms 30 are moved in the direction indicated by the arrow 31, the clod breaker is moved from its retracted position to its ground-engaging position, or vice versa, as the case may be.

The supporting means comprising the frame 16, A-frame 19, arms 20, 25 and 32 is readily attached and detached from supporting position on the tractor 24 by removing the pivot bolts attaching the arms 20, 25 and 32 to the tractor. Although these pivot bolts have not been shown in detail, their structure is of conventional structure apparent to those skilled in the art.

The frame 16 has mounted thereon a pair of sleeve members 40 and 41 through which pass locking bolts 42, 43 respectively for clamping in adjusted position the corresponding rods 44, 45 which extend upwardly from the scraper member 47.

Preferably, as shown in Figure 4, the sleeve members 40, 41 each have two cylindrical portions 40a, 40b, and 41a, 41b therethrough through which the rods 44, 45 may pass to allow skewing of the scraper blade 47 with respect to the direction of movement of the tractor. Thus the scraper blade 47 may be maintained in either one of four adjusted positions depending upon into which the rods 44, 45 are clamped.

This desirable arrangement of the cylindrical holes 40a, 40b, 41a, 41b not only allows adjustment of the scraper 47, but also provides means whereby a harrow 50 and a plow-supporting frame 51 may be mounted on the frame 16 after, of course, the scraper blade 47 is detached from the frame 16.

The harrow 50 has a pair of rods 52, 53 extending upwardly therefrom and spaced a distance equal to the spacing of the rods 44, 45 on the scraper 47. The rods 52, 53 are welded to a horizontally extending frame member 54 to which are welded, or preferably bolted, a plurality of ground-engaging spike members 55 for harrowing the ground.

The plow-supporting frame 51 has a pair of downwardly extending rods 62, 63 clamped in the cylindrical openings 40a, 41a. The upper end of the frame 51 has a pair of arms 64, 65 which are held in spaced relationship by the square bar 67 which is clamped near its ends in the clamps 69, 70 mounted respectively on the ends of the arms 64 and 65. In other words, the plow-supporting frame 51 comprises three detachable elements, namely, the arm 64 with associated rod 62, the arm 65 with associated rod 63, and the bar 67.

A plurality of curved plow members 72 may be clamped at predetermined spaced positions on and along the bar 67. These plow members 72 are thus releasably clamped onto the bar 67 and curved downwardly and inwardly to make furrows in the earth as the assembly is moved in the direction of arrows 75 in Figure 4. In such movement, the earth is first harrowed by the spikes 55, pulverized by the ring assembly 10, and furrowed by the plow elements 72.

Figure 8 shows an improved manner in which the individual rings 10 of my clod breaker may be held in assembled relation for operation as explained in my above-mentioned copending patent application. The intermediate rings 10 are of the same structure as explained in such copending application, but the end rings are internally threaded at 80 to receive an externally threaded adjustable sleeve member 81, which, in turn, is internally threaded to receive the threaded end of the rod 82. The rod 82 may be flexible in nature or may be rigid, an important feature being that the plugs 83 in each one of the end rings 10 may be adjusted to press adjacent rings together, as is preferred. In order to effect such adjustment, there is provided a screw driver slot 84 in the ends of the threaded sleeve member 81 to allow convenient turning by a suitable tool, such as a screw driver. Turning of the plug or sleeve member 81 thus causes alteration of the effective length of the rod 82. The clod breaker in all other respects is of identical structure shown in my above-mentioned copending application.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an earth-working device of the character described, a ground-engaging roller comprising a plurality of rings assembled generally coaxially, a pair of bearing members passing through said rings and spaced a distance apart less than the internal diameter of said rings, said bearing members being mounted on a frame whereby said roller may rotate on said frame and move radially with respect thereto to thereby allow said roller to be supported directly on the ground or on the frame or with some of the weight of the roller supported on the ground and some simultaneously supported on the frame, said frame having mounted thereon spaced pairs of sleeve members, a scraper member having a pair of rods extending therethrough adapted to pass through any one of a pair of said spaced sleeve members, and means for fastening said rods in said sleeve members whereby said scraper member may be supported in differently extending directions with respect to the frame.

2. In an earth-working device of the character described, a ground-engaging roller, a frame member, said roller comprising a plurality of rings assembled generally coaxially, bearing means mounted on said frame and extending through said rings to allow both rotation of said roller on said frame and independent radial movement of said roller with respect to said frame, and an earth-working tool mounted on said frame and arranged to be pressed into the ground with a force depending upon the position of the roller with respect to the frame, said roller being movable with respect to said frame to automatically change its distribution of weight, on the one hand, to the ground, and on the other hand, to the frame in accordance with the forces exerted on said earth-working tool.

3. In an earth-working device of the character described, a ground-engaging roller, a frame member, said roller comprising a tubular structure, bearing means mounted on said frame and extending through said tubular structure to allow both rotation of said roller on said frame and independent radial movement of said roller with respect to said frame, means arranged to pivotally mount said frame to the chassis of a vehicle, said vehicle having a power-actuated torque arm, a second pivoted arm pivotally attached to said power-actuated arm and to the first mentioned pivoted arm for moving said frame, a plurality of plow members releasably mounted on said frame, said plow members being arranged to be pressed into the ground with a force depending upon the position of the roller with respect to the frame, said roller being movable with respect to said frame to automatically change its distribution of weight, on the one hand to the ground, and on the other hand to the frame, in accordance with the forces exerted on said plow members.

LAFAYETTE E. GILREATH.

References Cited in the file of this patent

UNITED STATES PATENTS

| Number | Name | Date |
|---|---|---|
| 730,837 | Nichols | June 9, 1903 |
| 1,578,384 | Beatty et al. | Mar. 30, 1926 |
| 1,637,424 | Morrow | Aug. 2, 1927 |
| 1,783,009 | Cook | Nov. 25, 1930 |
| 2,303,043 | Goodman | Nov. 24, 1942 |
| 2,336,152 | Rude | Dec. 7, 1943 |
| 2,465,641 | Gardner | Mar. 29, 1949 |
| 2,472,386 | Schmeiser | June 7, 1949 |
| 2,513,165 | Gilreath | June 27, 1950 |

FOREIGN PATENTS

| Number | Country | Date |
|---|---|---|
| 253,233 | Italy | May 25, 1922 |
| 559,336 | Great Britain | Aug. 10, 1943 |